United States Patent
Bertolini et al.

(10) Patent No.: US 12,334,817 B2
(45) Date of Patent: Jun. 17, 2025

(54) DC-DC CONVERTER CIRCUIT AND CORRESPONDING METHOD OF OPERATION

(71) Applicant: STMicroelectronics S.r.l., Agrate Brianza (IT)

(72) Inventors: Alessandro Bertolini, Vermiglio (IT); Alessandro Gasparini, Cusano Milanino (IT); Paolo Melillo, Caltanissetta (IT); Salvatore Levantino, Milan (IT); Massimo Ghioni, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 201 days.

(21) Appl. No.: 18/132,774

(22) Filed: Apr. 10, 2023

(65) Prior Publication Data

US 2023/0336078 A1    Oct. 19, 2023

(30) Foreign Application Priority Data

Apr. 15, 2022    (IT) ........................ 102022000007685

(51) Int. Cl.
*H02M 3/07* (2006.01)
*H02M 1/00* (2007.01)
*H02M 3/158* (2006.01)

(52) U.S. Cl.
CPC ............ *H02M 3/07* (2013.01); *H02M 1/0003* (2021.05); *H02M 1/0095* (2021.05); *H02M 1/0025* (2021.05); *H02M 3/158* (2013.01)

(58) Field of Classification Search
CPC ............. H02M 1/0095; H02M 1/0048; H02M 1/0054; H02M 1/0025; H02M 3/07–078; H02M 3/158–15588
See application file for complete search history.

(56) References Cited

U.S. PATENT DOCUMENTS

| 5,650,739 A | 7/1997 | Hui et al. |
| 7,696,799 B2 | 4/2010 | Kim |

(Continued)

FOREIGN PATENT DOCUMENTS

KR    102226373 B1    3/2021

OTHER PUBLICATIONS

IT Search Report and Written Opinion for priority application, IT Appl. No. 102022000007685, report dated Nov. 11, 2022, 13 pgs.

(Continued)

*Primary Examiner* — Fred E Finch, III
(74) *Attorney, Agent, or Firm* — Crowe & Dunlevy LLC

(57) ABSTRACT

In a multi-level hybrid DC-DC converter with a flying capacitor, a feedback circuit includes a first oscillator and produces a first clock signal with a frequency dependent on an output voltage. A second oscillator produces a second clock signal having a frequency dependent on a reference voltage. A logic circuit switches, as a function of the first and second clock signals, connection of the flying capacitor between one state where the flying capacitor is connected between an input node and a switching node, and another state where the capacitor is connected between the switching node and a ground node. The duty cycle of the first/second clock signal varies so that when the flying capacitor voltage is lower than a target voltage a duration of the one state is increased, and when the flying capacitor voltage is higher than the target voltage a duration of the another state is increased.

16 Claims, 7 Drawing Sheets

(56) References Cited

U.S. PATENT DOCUMENTS

| | | | |
|---|---|---|---|
| 9,866,113 | B1 | 1/2018 | Assaad et al. |
| 9,929,653 | B1 | 3/2018 | Mercer et al. |
| 10,720,837 | B1* | 7/2020 | Agrawal .................. G06F 1/26 |
| 2019/0028031 | A1* | 1/2019 | Scoones ................ H02M 3/158 |
| 2021/0384830 | A1 | 12/2021 | Bertolini et al. |
| 2022/0029534 | A1 | 1/2022 | Chen |
| 2023/0029565 | A1* | 2/2023 | Yu .......................... H02M 3/158 |
| 2023/0327555 | A1* | 10/2023 | Nicolosi ................. H02M 3/01 |
| | | | 363/21.02 |

OTHER PUBLICATIONS

Xia, Ziyu, et al.: "A Two-Stage Cascaded Hybrid Switched-Capacitor DC-DC Converter with 96.9% Peak Efficiency Tolerating 0.6V/μs Input Slew Rate During Startup," 2021 IEEE International Solid-State Circuits Conference, 3 pgs.

Liu, Xun, et al.: "Analysis and Design Considerations of Integrated 3-Levl Buck Converters," IEEE Transactions on Circuits and Systems—I: Regular Papers, vol. 63, No. 5, May 2016, 12 pgs.

Kim, Seong Joong, et al.: "A 10-MHz 2-800-mA 0.5-1.5-V 90% Peak Efficiency Time-Based Buck Converter With Seamless Transition Between PWM/PFM Modes," IEEE Journal of Solid-State Circuits, vol. 53, No. 3, Mar. 2018, 11 pgs.

Kim, Seong Joong, et al.: "A 4-Phase 30-70 MHz Switching Frequency Buck Converter Using a Time-Based Compensator," IEEE Journal of Solid-State Circuits, vol. 50, No. 12, Dec. 2015, 11 pgs.

Kim, Seong Joong, et al.: "High Frequency Buck Converter Design Using Time-Based Control Techniques," IEEE Journal of Solid-State Circuits, vol. 50, No. 4, Apr. 2015, 12 pgs.

Khan Qadeer et al: "A 10-25MHz, 600mA buck converter using time-based PID compensator with 2 A/MHz quiescent current, 94% peak efficiency, and 1MHZ", 2014 Symposium on VLSI Circuits Digest of Technical Papers, IEEE, Jun. 10, 2014, pp. 1-2.

Rosa Tommaso et al: "A Novel Start-Up Technique for Time-Based Boost Converters with Seamless PFM/PWM Transition", 2019 IEEE International Symposium on Circuits and Systems (ISCAS), IEEE, Oct. 12, 2020, pp. 1-5, XP033933040.

* cited by examiner

DC-DC CONVERTER CIRCUIT AND CORRESPONDING METHOD OF OPERATION

PRIORITY CLAIM

This application claims the priority benefit of Italian Application for Patent No. 102022000007685 filed on Apr. 15, 2022, the content of which is hereby incorporated by reference in its entirety to the maximum extent allowable by law.

TECHNICAL FIELD

The description relates to time-based switched capacitor (SC) or hybrid DC-DC converters.

BACKGROUND

Throughout this description, various documents will be referred to by reproducing between square brackets (e.g., [X]) a number identifying a document in a list of reference documents that appears at the end of the detailed description. Each of these reference documents is incorporated herein by reference.

Time-based control techniques for electronic converters rely on the information inferable from the time shift (or delay) between time events in one or more control signals for controlling operation of the converter. For instance, such time events may be the edges of one or more digital (e.g., binary) signals, such as the rising edges, the falling edges, or both. The advantages of time-based control techniques, compared to conventional voltage-based control techniques, include a reduced silicon area occupation and a lower power consumption of the control circuitry. Such advantages become more relevant as the converter switching frequency increases and/or the technology node scales down. In particular, with regard to the switching frequency, the higher the converter switching frequency, the higher the control loop bandwidth, and so the larger the gain-bandwidth product (GBWP) of an analog error amplifier contained in the controller has to be in the case of a conventional voltage-based control architecture. A large bandwidth implies complex design and large power consumption of the voltage-based controller. With regard to the technology node scaling, analog signals are limited by the scaled (e.g., lowered) power supply and by the design complexity, while CMOS signals (e.g., signals switching between the positive supply rail $V_{DD}$ and the reference or ground supply rail $V_{GND}$) take advantage of the technology shrinking.

In this context, documents [1], [2] and [3] disclose high-frequency CMOS buck converters including a time-based controller.

FIG. 1 is a circuit diagram exemplary of a conventional buck converter 10. The buck converter 10 includes a half-bridge switching circuit arranged between an input node 100 configured to receive an input voltage $V_{in}$ and a ground node 102 configured to provide a ground voltage $V_{gnd}$ (e.g., 0 V). The half-bridge circuit includes a high-side switch HS arranged between the input node 100 and a switching node 104 where a voltage $V_X$ is produced, and a low-side switch LS arranged between the switching node 104 and the ground node 102. Switches HS and LS may include (e.g., consist of) transistors (e.g., power transistors) such as a metal-oxide-semiconductor (MOS) transistors, optionally n-channel MOS transistors. The buck converter 10 is configured for coupling to an inductor L (e.g., an external inductor) having a first terminal coupled to the switching node 104 and a second terminal coupled to an output node 106 where an output voltage $V_{out}$ is produced. A capacitor $C_O$ (e.g., an external capacitor) may be coupled between the output node 106 and the ground node 102 to operate the converter (e.g., to stabilize the output voltage $V_{out}$).

A conventional buck converter 10 as exemplified in FIG. 1 may have two main limitations in the case of large conversion ratios. In particular, for high values of the input voltage $V_{in}$, the power switches HS and LS have to be high-voltage rated, and typically high-voltage rated MOS transistors are less conductive and larger than low-voltage rated MOS transistors. Additionally, large values of the input voltage $V_{in}$ and low values of the output voltage $V_{out}$ imply high voltage drops on the inductor L, which may result in large current ripples in the inductor L, and thus also produce large output voltage ripples.

A known circuit arrangement that may be used to mitigate the above-mentioned limitations of conventional converters is exemplified in FIG. 2, which is a circuit diagram exemplary of a three-level (in short, 3 L) hybrid buck converter 20. Conventionally, the wording "three-level" converter refers to a switched capacitor converter (e.g., including four power transistors and a flying capacitor) where the switching node can switch between three different voltage levels (e.g., $V_{in}$, $V_{in}/2$, and $V_{gnd}$), and the wording "hybrid converter" refers to a switched capacitor converter operating with an inductor, which allows regulating the output voltage $V_{out}$ (while conventional switched capacitor converters have a fixed conversion ratio).

As exemplified in FIG. 2, the three-level hybrid buck converter 20 includes a four-switch switching circuit arranged between an input node 200 configured to receive an input voltage $V_{in}$ and a ground node 202 configured to provide a ground voltage $V_{gnd}$ (e.g., 0 V). The switching circuit includes a first high-side switch M1 arranged between the input node 200 and a high-side intermediate node 203, a second high-side switch M2 arranged between the high-side intermediate node 203 and a switching node 204 where a voltage $V_X$ is produced, a first low-side switch M3 arranged between the switching node 204 and a low-side intermediate node 205, and a second low-side switch M4 arranged between the low-side intermediate node 205 and the ground node 202. Switches M1, M2, M3 and M4 may include (e.g., consist of) transistors such as a MOS (power) transistors, optionally n-channel MOS transistors. The buck converter 20 further includes a capacitor $C_f$ (which can be an integrated capacitor or an external capacitor, e.g., depending on the converter size and/or speed and thus on the application), also referred to as flying capacitor, arranged between the intermediate high-side node 203 and the intermediate low-side node 205. The voltage drop across capacitor $C_f$ (i.e., between nodes 203 and 205) is indicated herein as $V_f$. The buck converter 20 is configured to be coupled to an inductor L (e.g., an external inductor) having a first terminal coupled to the switching node 204 and a second terminal coupled to an output node 206 where an output voltage $V_{out}$ is produced. A capacitor $C_O$ (e.g., an external capacitor) may be coupled between the output node 206 and the ground node 202 to operate the converter 20 (e.g., to stabilize the output voltage $V_{out}$).

The operation principle of a three-level buck converter 20 is explained with reference to FIGS. 3A to 3D, which are circuit diagrams exemplary of different operation phases of a buck converter 20 operating at steady-state. In particular, greyed-out components illustrated in FIGS. 3A to 3D are intended to indicate the switches that are not conductive (e.g., off) during each operation phase.

As exemplified in FIG. 3A, during a first operation phase of converter 20 (phase φ1 having duration $T_{φ1}$), switches M1 and M3 are closed (e.g., conductive, on) and switches M2 and M4 are open (e.g., non-conductive, off). A current flows from the input node 200 to the output node 206 through switch M1, node 203, capacitor $C_f$, node 205, switch M3, node 204, inductor L. During the first phase, the voltage $V_X$ at the switching node 204 is equal to $V_X=V_{in}-V_f=V_{in}/2$. During the first phase, capacitor $C_f$ is thus coupled between the input node 200 and the switching node 204 (i.e., the inductor L), and it gets charged.

As exemplified in FIG. 3B, during a second operation phase of converter 20 (phase φ2 having duration $T_{φ2}$), switches M3 and M4 are closed and switches M1 and M2 are open. A current flows from the ground node 202 to the output node 206 through switch M4, node 205, switch M3, node 204, inductor L. During the second phase, the voltage $V_X$ at the switching node 204 is equal to $V_X=V_{gnd}=0$ V.

As exemplified in FIG. 3C, during a third operation phase of converter 20 (phase φ3 having duration $T_{φ3}$), switches M2 and M4 are closed and switches M1 and M3 are open. A current flows from the ground node 202 to the output node 206 through switch M4, node 205, capacitor $C_f$, node 203, switch M2, node 204, inductor L. During the third phase, the voltage $V_X$ at the switching node 204 is equal to $V_X=V_f=V_{in}/2$. During the third phase, capacitor $C_f$ is thus coupled between the switching node 204 (i.e., the inductor L) and the ground node 202, and it gets discharged.

As exemplified in FIG. 3D, during a fourth operation phase of converter 20 (phase φ4 having duration $T_{φ4}$), switches M3 and M4 are closed and switches M1 and M2 are open. A current flows from the ground node 202 to the output node 206 through switch M4, node 205, switch M3, node 204, inductor L. During the fourth phase, the voltage $V_X$ at the switching node 204 is equal to $V_X=V_{gnd}=0$ V.

Therefore, the conversion ratio $V_{out}/V_{in}$ of converter 20 operating according to the four-phase operation scheme described with reference to FIGS. 3A to 3D can be computed as:

$$\frac{V_{out}}{V_{in}} = \frac{T_{φ1} + T_{φ3}}{2 \cdot T_{SW}}$$

where $T_{φ1}$ is the duration of the first phase φ1, $T_{φ3}$ is the duration of the third phase φ3, and $T_{SW}$ is the duration of a switching cycle (e.g., $T_{SW}=T_{φ1}+T_{φ2}+T_{φ3}+T_{φ4}$).

The operation scheme exemplified in FIGS. 3A to 3D allows the output voltage $V_{out}$ to vary between $V_{gnd}$ and $V_{in}/2$ (i.e., it allows a conversion ratio between 0 and 0.5, limiting the maximum output voltage $V_{out}$ to $V_{in}/2$). Alternatively, the second phase and the fourth phase (exemplified in FIGS. 3B and 3D, respectively) may be modified by connecting the switching node 204 to the input node 200 (at voltage $V_{in}$) instead of connecting it to the ground node 202 (at voltage $V_{gnd}=0$ V). In other terms, during the second modified phase and the fourth modified phase the switches M1 and M2 may be closed and the switches M3 and M4 may be open, so that a current would flow from the input node 200 to the output node 206 through switch M1, node 203, switch M2, node 204, inductor L. During the second and fourth modified phases, the voltage $V_X$ at the switching node 204 would thus be equal to $V_X=V_{in}$. As a result, the "modified" operation scheme allows the output voltage $V_{out}$ to vary between $V_{in}/2$ and $V_{in}$ (i.e., it allows a conversion ratio between 0.5 and 1, limiting the minimum output voltage $V_{out}$ to $V_{in}/2$).

As anticipated, a three-level hybrid (buck) converter 20 as exemplified in FIG. 2 may mitigate the above-mentioned limitations of conventional (buck) converters. In particular, capacitor $C_f$ maintains a constant voltage $V_f=V_{in}/2$ across its plates, reducing the voltage stress on the power MOS transistors M1, M2, M3, M4 and thus facilitating reducing the overall silicon area occupation and the switching losses (e.g., allowing the implementation of smaller MOS transistors M1, M2, M3, M4). Additionally, the maximum voltage across the inductor L is limited to $V_{in}/2-V_{out}$, reducing current and voltage ripples. Document [4] provides a detailed analysis and comparison between conventional and three-level buck converters.

In a three-level buck converter 20 as exemplified in FIGS. 2 and 3A to 3D, precise voltage conversion with low voltage ripples and low losses may be sought by keeping the voltage $V_f$ across capacitor $C_f$ constant to a value as close as possible to $V_{in}/2$. As discussed with reference to FIGS. 3A to 3D, if the intervals $T_{φ1}$ and $T_{φ3}$ are equal, capacitor $C_f$ is charged and discharged by the same amount of charge. However, mismatches in the driving signals of switches M1, M2, M3 and M4, and/or bottom plate parasitic capacitance effects may produce a difference in the charge sourced to capacitor $C_f$ during the first operation phase (FIG. 3A) and the charge sunk from capacitor $C_f$ during the third operation phase (FIG. 3C). An unbalanced voltage on capacitor $C_f$ resulting from such non-idealities could result in voltage overstress on the power transistors M1, M2, M3, M4.

In view of the known solutions discussed above, there is a need in the art to provide three-level hybrid DC-DC switching converters including improved time-based controller circuits that facilitate balancing of the flying capacitor voltage.

SUMMARY

An object of one or more embodiments is to contribute in providing such improved DC-DC switching converters.

According to one or more embodiments, such an object can be achieved by a circuit having the features set forth in the claims that follow.

One or more embodiments may relate to a corresponding method of operating a DC-DC switching converter.

The claims are an integral part of the technical teaching provided herein in respect of the embodiments.

In one or more embodiments, a DC-DC converter circuit includes a switching stage arranged between an input node configured to receive an input voltage and a ground node configured to provide a ground voltage. The switching stage includes a switching node selectively couplable to the input node or to the ground node. The switching node is configured to be coupled to an inductor for producing an output voltage at an output node of the DC-DC converter circuit. The switching stage also includes a capacitor having a first terminal selectively couplable to the input node or to the switching node and a second terminal selectively couplable to the switching node or to the ground node. The converter circuit includes a time-based feedback circuit including a first voltage-controlled oscillator (e.g., a feedback VCO). The time-based feedback circuit is configured to produce a first clock signal having a respective frequency that is a function of the converter output voltage. The converter circuit includes a second voltage-controlled oscillator (e.g., a reference VCO) configured to produce a second clock signal having a respective frequency that is a function of a reference voltage. The converter circuit includes a logic circuit configured to receive the first clock signal and the second clock signal and to produce, as a function thereof, one or more control signals for switching operation of the switching stage between first, second, third and fourth operating phases. In the first operating phase the capacitor is connected between the input node and the switching node. In the second operating phase the capacitor has one floating terminal and the switching node is connected either to the input node or to the ground node. In the third operating phase the capacitor is connected between the switching node and the ground node. In the fourth operating phase the capacitor has one floating terminal and the switching node is connected either to the input node or to the ground node. The converter circuit also includes a voltage balancing circuit configured to sense a voltage across the capacitor, compare the sensed voltage to a target voltage, and produce a balancing signal indicative of the difference between the sensed voltage and the target voltage. At least one of the first voltage-controlled oscillator and the second voltage-controlled oscillator is configured to receive the balancing signal and to vary the duty-cycle of the respective produced clock signal as a function thereof. If the balancing signal is indicative of the sensed voltage being lower than the target voltage, the duration of the first operating phase is increased, and if the balancing signal is indicative of the sensed voltage being higher than the target voltage, the duration of the third operating phase is increased.

One or more embodiments may thus facilitate balancing the voltage across the flying capacitor of a hybrid, switched capacitor DC-DC converter that includes a time-based control architecture.

In one or more embodiments, the switching stage includes a first high-side switch arranged between the input node and a high-side intermediate node, a second high-side switch arranged between the high-side intermediate node and the switching node, a first low-side switch arranged between the switching node and a low-side intermediate node, and a second low-side switch arranged between the low-side intermediate node and the ground node. The capacitor is arranged between the high-side intermediate node and the low-side intermediate node.

In one or more embodiments, the DC-DC converter circuit includes a voltage divider circuit coupled to the output node to receive the output voltage and produce a feedback voltage as a function thereof (e.g., proportionally to the output voltage), and the first voltage-controlled oscillator is configured to produce the first clock signal having a respective frequency that is a function of the feedback voltage.

In one or more embodiments, the first voltage-controlled oscillator is configured to produce an intermediate clock signal having a respective frequency that is a function of the output voltage, and the time-based feedback circuit further includes a first delay element and a second delay element configured to delay the intermediate clock signal as a function of a first signal indicative of the output voltage and a second signal indicative of the time derivative of the output voltage, respectively, to produce the first clock signal.

In one or more embodiments, the logic circuit is configured to produce the one or more control signals so that the switching stage switches to the first operating phase in response to a rising edge detected in the second clock signal, to the second operating phase in response to a rising edge detected in the first clock signal, to the third operating phase in response to a falling edge detected in the second clock signal, and to the fourth operating phase in response to a falling edge detected in the first clock signal.

In one or more embodiments, the logic circuit is configured to produce the one or more control signals so that the switching stage switches to the first operating phase in response to the first clock signal being de-asserted and the second clock signal being asserted, to the second operating phase in response to the first clock signal being asserted and the second clock signal being asserted, to the third operating phase in response to the first clock signal being asserted and the second clock signal being de-asserted, and to the fourth operating phase in response to the first clock signal being de-asserted and the second clock signal being de-asserted.

In one or more embodiments, the target voltage is equal to half of the input voltage.

In one or more embodiments, the voltage balancing circuit includes a transconductance amplifier circuit having a first input configured to receive the voltage sensed across the capacitor and a second input configured to receive the target voltage, and a further capacitor having a first terminal coupled to the output of the transconductance amplifier to be charged and discharged thereby. The balancing signal is produced at the first terminal of the further capacitor.

In one or more embodiments, the first voltage-controlled oscillator and/or the second voltage-controlled oscillator includes an oscillator circuit configured to produce an oscillating signal having a respective frequency that is a function of the output voltage and/or the reference voltage, respectively. The first voltage-controlled oscillator and/or the second voltage-controlled oscillator includes a delay circuit configured to produce a delayed replica of the oscillating signal, wherein the amount of delay of the delayed replica is a function of the balancing signal. The first voltage-controlled oscillator and/or the second voltage-controlled oscillator includes a logic circuit configured to assert the respective produced clock signal in response to an edge detected (e.g., rising or falling) in the oscillating signal, and de-assert the respective produced clock signal in response to a corresponding edge (e.g., rising or falling, respectively) detected in the delayed replica of the oscillating signal.

In one or more embodiments, a method of operating a DC-DC converter circuit includes:
  providing an input voltage to the input node of the DC-DC converter circuit;
  producing a first clock signal having a respective frequency that is a function of the output voltage of the DC-DC converter circuit;
  producing a second clock signal having a respective frequency that is a function of a reference voltage;
  switching operation of the switching stage of the DC-DC converter circuit, as a function of the first clock signal and the second clock signal, between a first operating phase wherein the capacitor is connected between the input node and the switching node, a second operating phase wherein the capacitor has one floating terminal and the switching node is connected either to the input node or to the ground node, a third operating phase wherein the capacitor is connected between the switching node and the ground node, and a fourth operating phase wherein the capacitor has one floating terminal and the switching node is connected either to the input node or to the ground node;
  sensing a voltage across the capacitor of the DC-DC converter circuit, comparing the sensed voltage to a target voltage, and producing a balancing signal indicative of the difference between the sensed voltage and the target voltage; and varying the duty-cycle of at least one of the first clock signal and the second clock signal as a function of the balancing signal, so that if the balancing signal is indicative of the sensed voltage being lower than the target voltage the duration of the first operating phase is increased, and if the balancing signal is indicative of the sensed voltage being higher than the target voltage the duration of the third operating phase is increased.

BRIEF DESCRIPTION OF THE DRAWINGS

One or more embodiments will now be described, by way of example only, with reference to the annexed figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is included in at least one embodiment. Hence, phrases such as "in an embodiment" or "in one embodiment" that may be present in one or more points of the present description do not necessarily refer to one and the same embodiment. Moreover, particular configurations, structures, or characteristics may be combined in any adequate way in one or more embodiments.

The headings/references used herein are provided merely for convenience and hence do not define the extent of protection or the scope of the embodiments.

Throughout the figures annexed herein, unless the context indicates otherwise, like parts or elements are indicated with like references/numerals and a corresponding description will not be repeated for the sake of brevity.

Figure 1:
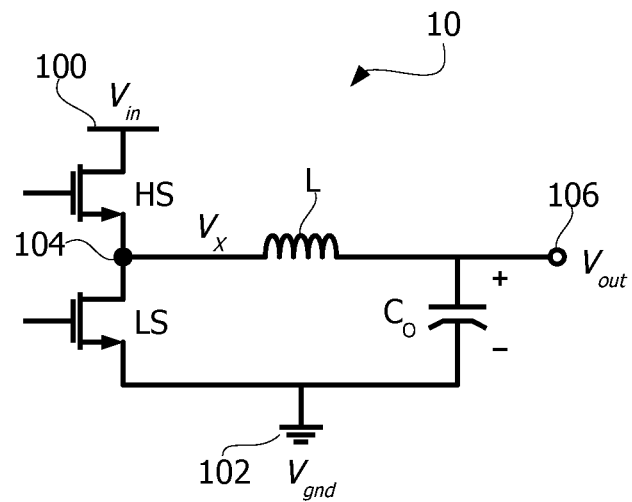
FIG. 1, previously presented, is a circuit diagram exemplary of a conventional buck converter.
Figure 2:
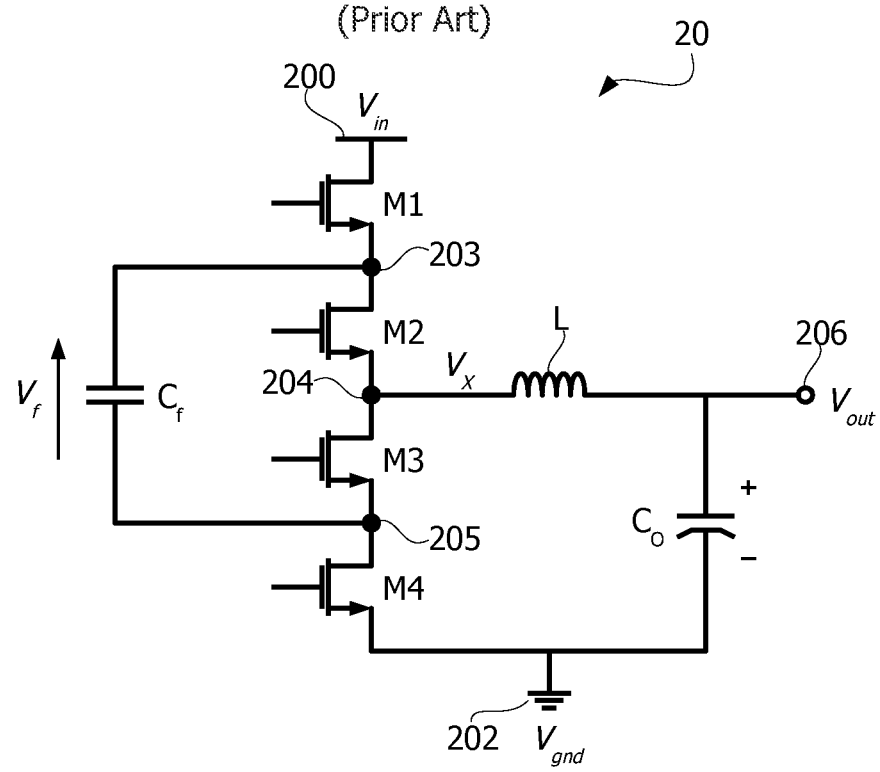
FIG. 2, previously presented, is a circuit diagram exemplary of a three-level hybrid buck converter.
Figure 3A:
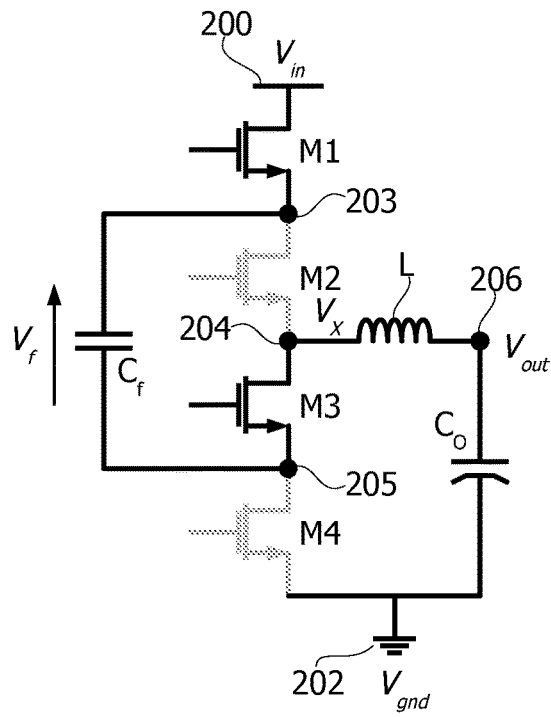
FIGS. 3A to 3D, previously presented, are circuit diagrams exemplary of different operation phases of a three-level hybrid buck converter operating at steady-state.
Figure 3B:
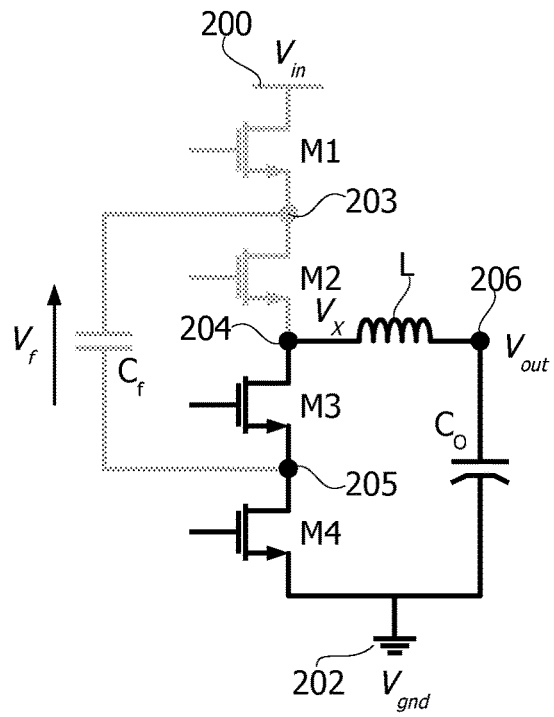
Figure 3D:
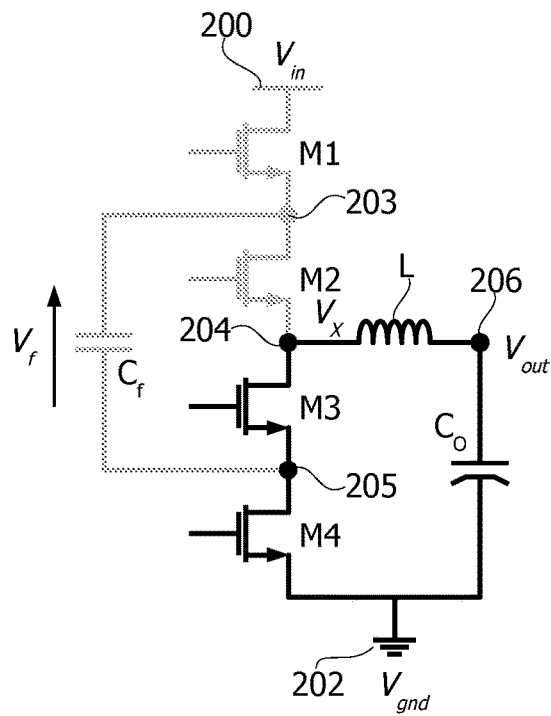
Figure 3C:
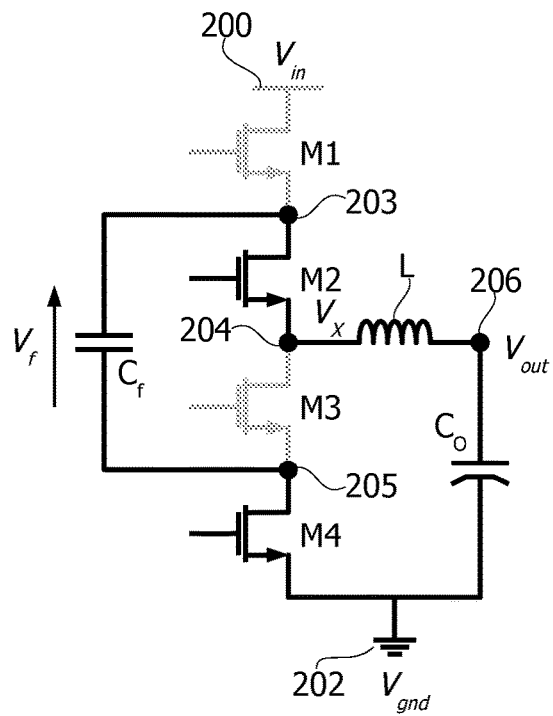
Figure 4:
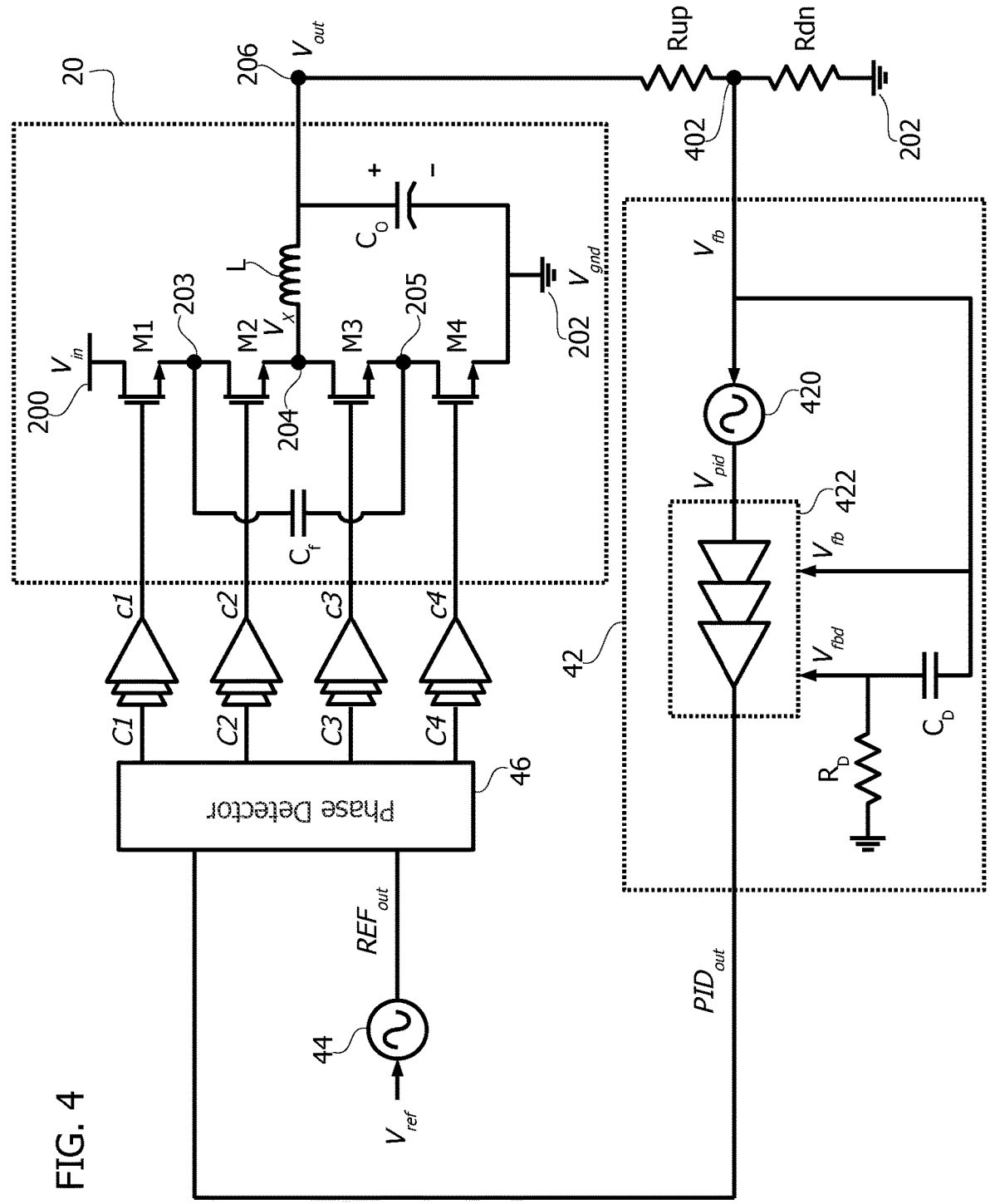
FIG. 4 is a circuit diagram exemplary of a three-level hybrid buck converter including a time-based controller circuit.

By way of introduction to the detailed description of one or more exemplary embodiments, reference may be first made to FIG. 4, which is a circuit block diagram exemplary of a three-level hybrid buck converter 20 and related time-based control circuitry. A similar time-based control architecture is known, e.g., from United States Patent Publication No. 2021/0384830 A1 (incorporated here by reference).

As exemplified in FIG. 4, the control circuitry of converter 20 includes a voltage divider circuit (e.g., a resistive ladder) coupled to the output node 206 of converter 20 and configured to produce a feedback (voltage) signal $V_{fb}$ indicative of (e.g., proportional to) the output voltage $V_{out}$. For instance, the voltage divider circuit may include a first resistor Rup and a second resistor Rdn coupled in series between node 206 and ground node 202, where the feedback signal $V_{fb}$ is produced at a node 402 intermediate the resistors Rup and Rdn. The control circuitry also includes a PWM signal generation circuit configured to generate one or more PWM signals C1, C2, C3, C4 as a function of the feedback signal $V_{fb}$ and a reference voltage $V_{ref}$. The control circuitry also includes one or more driver circuits configured to drive a (buck) switching stage 20 as a function of the PWM signal(s) C1, C2, C3, C4, e.g., producing respective drive signals c1, c2, c3, c4.

As exemplified in FIG. 4, the PWM signal generation circuit relies on a time-based proportional-integral-derivative (PID) controller circuit 42 coupled to node 402 to receive the feedback signal $V_{fb}$ and configured to produce a first converter control signal $PID_{out}$ as a function thereof.

In particular, the time-based PID controller 42 may include a feedback voltage-controlled oscillator (FVCO) 420 configured to receive the feedback voltage signal $V_{fb}$ and generate a first clock signal $V_{pid}$ as a function of the feedback signal $V_{fb}$, e.g., having a frequency that is a function of the value of signal $V_{fb}$. The time-based PID controller 42 may further include an analog differentiator (e.g., a derivative filter circuit) configured to generate a signal $V_{fbd}$ indicative of (e.g., proportional to) the derivative of the feedback signal $V_{fb}$. In particular, the analog differentiator may include a capacitor CD having a first terminal coupled to node 402 to receive the feedback signal $V_{fb}$ and a second terminal coupled to a first terminal of a resistor RD. The resistor RD may have a second terminal coupled to ground node 202. Therefore, signal $V_{fbd}$ indicative of the derivative of the feedback signal $V_{fb}$ is produced at the node intermediate capacitor CD and resistor RD. The time-based PID controller 42 may further include a feedback voltage-controlled delay line 422 configured to receive the first clock signal $V_{pid}$ and produce a delayed first clock signal $PID_{out}$ as a function thereof. In particular, the delay line 422 may include a first delay element having a delay as a function of the feedback signal $V_{fb}$ and a second delay element having a delay as a function of signal $V_{fbd}$. The first and second delay elements are connected in cascade and generate the delayed first clock signal $PID_{out}$. Delay lines having a programmable delay as a function of a voltage or current signal are well known in the art. For example, U.S. Pat. Nos. 5,650,739 A or 7,696,799 B2 (incorporated by reference) may be cited in this context.

As exemplified in FIG. 4, the PWM signal generation circuit of converter 20 further includes a reference voltage-controlled oscillator (RVCO) 44 configured to receive a reference voltage $V_{ref}$ and produce a second clock signal $REF_{out}$ (e.g., a reference oscillating signal) having a frequency that is a function of the value of the reference signal $V_{ref}$ (e.g., a period $T_{VCO}$).

As exemplified in FIG. 4, the PWM signal generation circuit of converter 20 further includes a phase detector circuit 46 (e.g., implemented as an asynchronous finite state machine, AFSM) configured to receive the first delayed clock signal $PID_{out}$ and the second clock signal $REF_{out}$ and to produce the PWM signal(s) C1, C2, C3, C4 as a function thereof. In particular, the values of the PWM signal(s) C1, C2, C3, C4 can be determined as a function of the phase difference Φ (or phase shift) between the clock signals $PID_{out}$ and $REF_{out}$.

In the embodiment considered, the reference voltage-controlled oscillator 44 thus provides a reference clock signal $REF_{out}$ having a given (fixed or settable) frequency as a function of the reference voltage $V_{ref}$. Conversely, the feedback voltage-controlled oscillator 420 varies the frequency of the first clock signal $V_{pid}$ until the feedback signal $V_{fb}$ corresponds to the reference voltage $V_{ref}$, and in this steady condition the frequency of the first clock signal $V_{pid}$ corresponds to the frequency of the second (reference) clock signal $REF_{out}$, but the clock signals are phase shifted by a given phase $Φ_I$. The first oscillator 420 thus implements a regulator with I (integral) component of the phase $Φ_I$. Conversely, the first delay element and the second delay element in the delay line 422 introduce an additional phase (DP proportional to the feedback signal $V_{fb}$ and an additional phase $Φ_D$ proportional to the derivative $V_{fbd}$ of the feedback signal $V_{fb}$, i.e., the total phase shift Φ corresponds to $Φ=Φ_I+Φ_P+Φ_D$. The phase shift Φ is detected by the phase detector circuit 46 and used to determine the values of the PWM signals C1, C2, C3, C4 for driving the switching stage 20. Therefore, the ON-times (and/or the duty-cycle values) of signals C1, C2, C3, C4 are varied via a time-based control (with PID regulation) of the phase shift Φ as a function of the feedback signal $V_{fb}$ and the reference voltage $V_{ref}$. Accordingly, the phase detector 46 may also perform other operations, such as a down-scaling operation of the frequency of the clock signals \rpm and/or $REF_{out}$, and it is only relevant that the phase detector 46 is configured to generate PWM signals C1, C2, C3, C4 wherein the switch-on duration (or the duty-cycle) of these signals is determined as a function of the phase shift Φ between signals $PID_{out}$ and $REF_{out}$.

Figure 5:
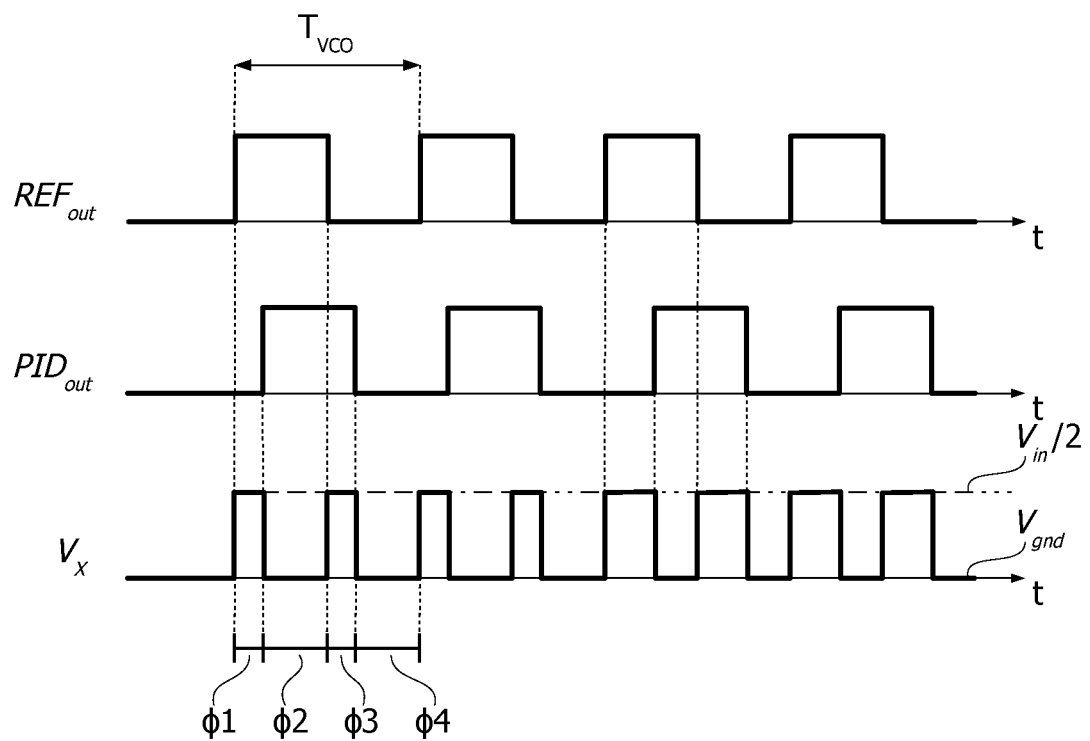
FIG. 5 is a time diagram exemplary of possible time evolution of signals in the converter of FIG. 4.

Operation of the control circuitry of converter 20 may be further understood with reference to FIG. 5, which is a time diagram exemplary of possible time evolution of signals $REF_{out}$, $PID_{out}$ and $V_X$ in the converter of FIG. 4. For instance, the phase detector (e.g., finite state machine) 46 may be edge-triggered and may thus detect both rising and falling edges of signals $REF_{out}$ and $PID_{out}$ (e.g., each having a 50% duty-cycle) to produce the PWM signals C1, C2, C3, C4 so that the three-level buck converter 20 operates two phases for each semi-period of the reference clock signal $REF_{out}$. In particular, the finite state machine 46 may set the converter 20 to operate in the first phase (φ1) in response to a rising edge detected in signal $REF_{out}$, in the second phase (φ2) in response to a rising edge detected in signal $PID_{out}$, in the third phase (φ3) in response to a falling edge detected in signal $REF_{out}$, and in the fourth phase (φ4) in response to a falling edge detected in signal $PID_{out}$, with voltage $V_X$ at node 204 switching accordingly between $V_{in}/2$ and $V_{gnd}$ (e.g., 0 V) or $V_{in}$. Additionally or alternatively, the phase detector 46 may be level-triggered and may thus detect the levels of both signals $REF_{out}$ and $PID_{out}$ to produce the PWM signals C1, C2, C3, C4 so that the three-level buck converter 20 operates two phases for each semi-period of the reference clock signal $REF_{out}$. In particular, the finite state machine 46 may set the converter 20 to operate in the first phase (φ1) in response to signal $REF_{out}$ being asserted and signal $PID_{out}$ being de-asserted, in the second phase (φ2) in response to signal $REF_{out}$ being asserted and signal $PID_{out}$ being asserted, in the third phase (φ3) in response to signal $REF_{out}$ being de-asserted and signal $PID_{out}$ being asserted, and in the fourth phase (φ4) in response to signal $REF_{out}$ being de-asserted and signal $PID_{out}$ being de-asserted, with voltage $V_X$ at node 204 switching accordingly between $V_{in}/2$ and $V_{gnd}$ (e.g., 0 V) or $V_{in}$.

Figure 6:
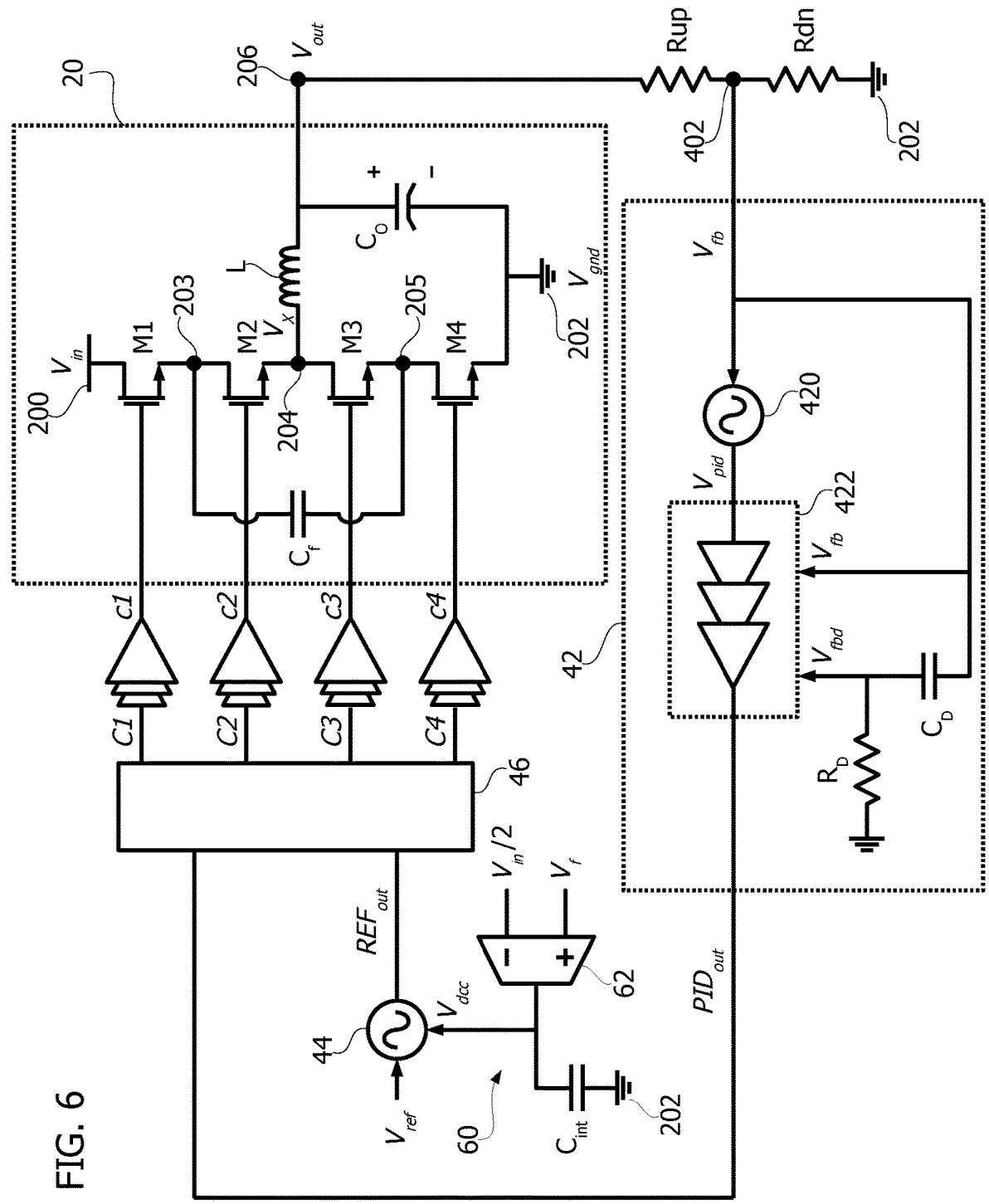
FIG. 6 is a circuit diagram exemplary of a three-level hybrid buck converter including a time-based controller circuit according to one or more embodiments of the present description.

One or more embodiments relate to improvements of the control circuitry of converter that facilitate balancing the voltage across capacitor $C_f$. FIG. 6 is a circuit block diagram exemplary of a three-level hybrid buck converter including such improved time-based control circuitry.

In particular, as exemplified in FIG. 6, one or more embodiments rely on the time-based control circuitry disclosed with reference to FIG. 4 (that is, including time-based PID controller 42, reference voltage-controlled oscillator 44 and phase detector 46) to regulate the output voltage $V_{out}$. Additionally, the control circuitry includes a flying capacitor voltage balancing circuit 60 configured to sense the flying capacitor voltage $V_f$ and the input voltage $V_{in}$, and produce a duty-cycle control signal $V_{dcc}$ indicative of the difference between the actual flying capacitor voltage $V_f$ and the target flying capacitor voltage, which is equal to half of the input voltage $V_{in}$ (i.e., $V_{in}/2$). For instance, the balancing circuit 60 may comprise a transconductance amplifier circuit 62 having a first (e.g., non-inverting) input configured to receive the flying capacitor voltage $V_f$ and a second (e.g., inverting) input configured to receive a target voltage (e.g., voltage $V_{in}/2$ which may be produced starting from voltage yin, e.g., via a voltage divider circuit not visible in the Figures annexed herein). The transconductance amplifier circuit 62 may thus produce an output current as a function of (e.g., proportional to) the difference between $V_f$ and the target voltage (e.g., $V_{in}/2$). The balancing circuit 60 may further comprise a capacitor $C_{int}$ coupled between the output of amplifier 62 and ground 202, thus configured to be charged and discharged by the output current of amplifier 62. By this arrangement, a voltage duty-cycle control signal $V_{dcc}$ is produced across capacitor $C_{int}$ which is indicative of (e.g., proportional to) the difference between $V_f$ and the target voltage (e.g., $V_{in}/2$). The reference voltage-controlled oscillator 44 is configured to receive the duty-cycle control signal $V_{dcc}$ and adjust the duty-cycle of the reference clock signal $REF_{out}$ accordingly. For instance, signal $V_{dcc}$ may be used to control an amount of advance or an amount of delay of the falling edges of the clock signal $REF_{out}$ with respect to a 50% duty-cycle clock signal. By doing so, it is possible to introduce an imbalance between the flying capacitor charge phase (e.g., phase φ1) and the flying capacitor discharge phase (e.g., phase φ3).

Figure 7:
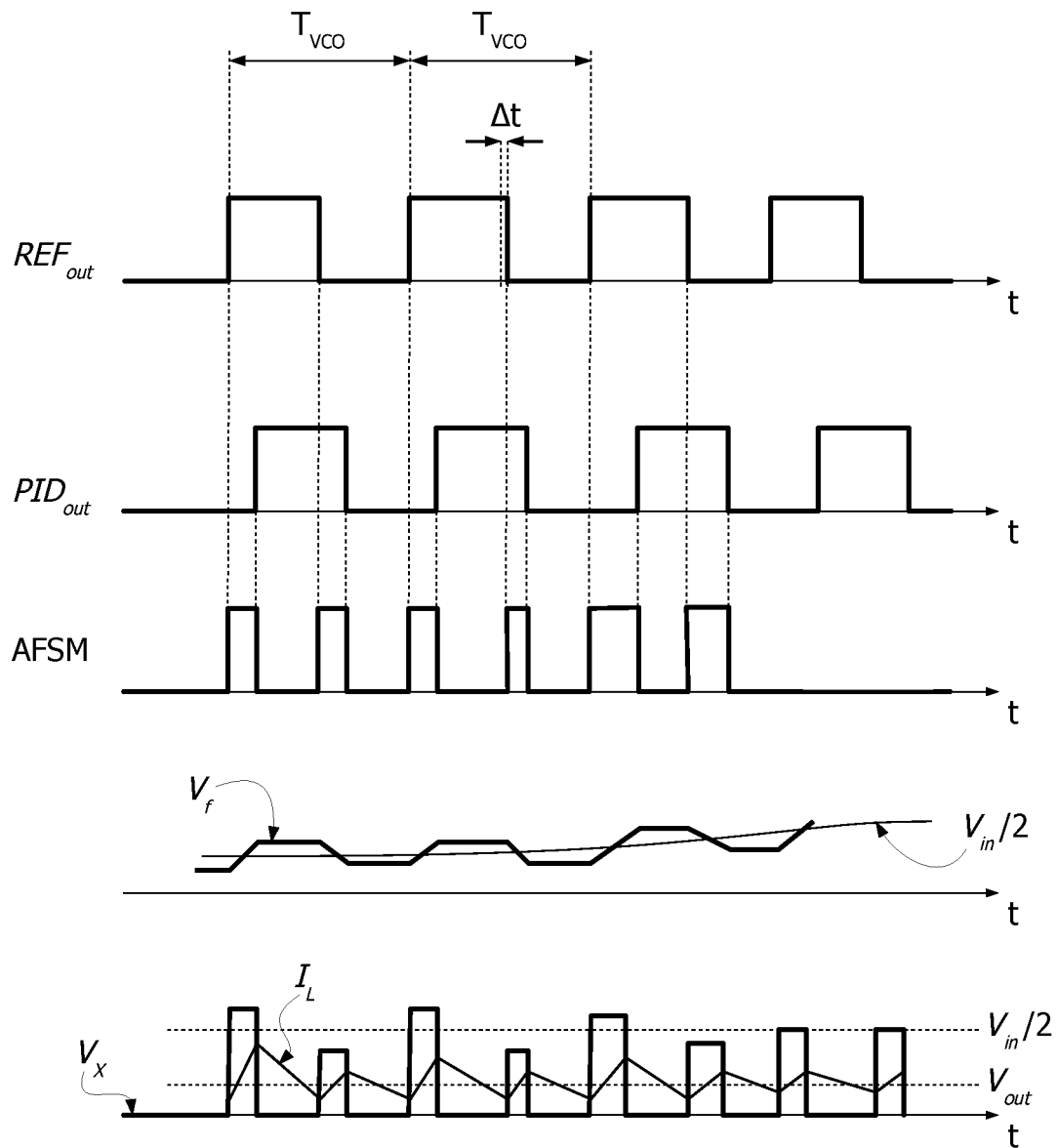
FIG. 7 is a time diagram exemplary of possible time evolution of signals in the converter of FIG. 6.

Operation of the improved control circuitry of converter 20 may be further understood with reference to FIG. 7, which is a time diagram exemplary of possible time evolution of signals $REF_{out}$, $PID_{out}$, $V_f$, $V_X$, $I_L$ (i.e., the inductor current) and $V_{out}$ in the converter of FIG. 6, where the phase detector 46 is assumed to operate as disclosed with reference to FIG. 5. With reference to FIG. 7, we can assume that the reference voltage-controlled oscillator 44 and the feedback voltage-controlled oscillator 420 operate at a nominal (e.g., steady-state) duty-cycle equal to 50%. As previously discussed, the output voltage $V_{out}$ is regulated by the phase detector (e.g., finite state machine) 46 using both the rising and the falling edges of the clock signals coming from the reference path (i.e., $REF_{out}$) and from the feedback path (i.e., $PID_{out}$), or using their levels. At steady-state, two symmetrical control phases are produced (φ1 and φ3), and the voltage $V_X$ at the switching node 204 is switched between ($V_{in}-V_f$) and $V_f$. If $V_f$ is not equal to the target voltage (e.g., $V_{in}/2$), the duty-cycle of clock signal $REF_{out}$ produced by the reference voltage-controlled oscillator 44 is changed (see, e.g., the duty-cycle being increased by a quantity Δt at the second falling edge of signal REF$_{out}$ in FIG. 7, thereby reducing the duration of the third operation phase of converter 20) to produce an imbalance between the first control phase and the third control phase, thereby balancing the flying capacitor voltage V$_f$. In this way, the charge phase and the discharge phase of capacitor C$_f$ are not symmetrical anymore, and the voltage V$_f$ across capacitor C$_f$ changes. In the meanwhile, the main control loop of converter 20 operates to keep the output voltage V$_{out}$ equal to the reference voltage V$_{ref}$. Once the voltage V$_f$ across capacitor C$_f$ is again equal to the target voltage (e.g., V$_{in}$/2), the duty-cycle of the reference clock signal REF$_{out}$ returns to its steady-state value (e.g., 50%).

By resorting to the operation discussed above, the power switches M1, M2, M3, M4 may be protected from sustaining a voltage that could be much higher than V$_{in}$/2, which could occur both at startup and during line/load transient in a three-level converter as exemplified herein, also at steady-state due to the presence of parasitic capacitor which could create an unbalance on the flying capacitor voltage.

It will be noted that one or more embodiments have been disclosed herein (e.g., with reference to FIG. 6) where the duty-cycle control signal V$_{dcc}$ is received by the reference voltage-controlled oscillator 44 to produce an imbalance between the flying capacitor charge and discharge phases and thereby balancing the flying capacitor voltage. Additionally or alternatively, in one or more embodiments, the duty-cycle control signal V$_{dcc}$ may be received by the feedback voltage-controlled oscillator 420 in order to produce the same effect by adjusting the duty-cycle of the first (delayed) clock signal PID$_{out}$. For instance, signal V$_{dcc}$ may be used to control an amount of advance or an amount of delay of the falling edges of signal PID$_{out}$ with respect to a 50% duty-cycle clock signal.

Figure 8:
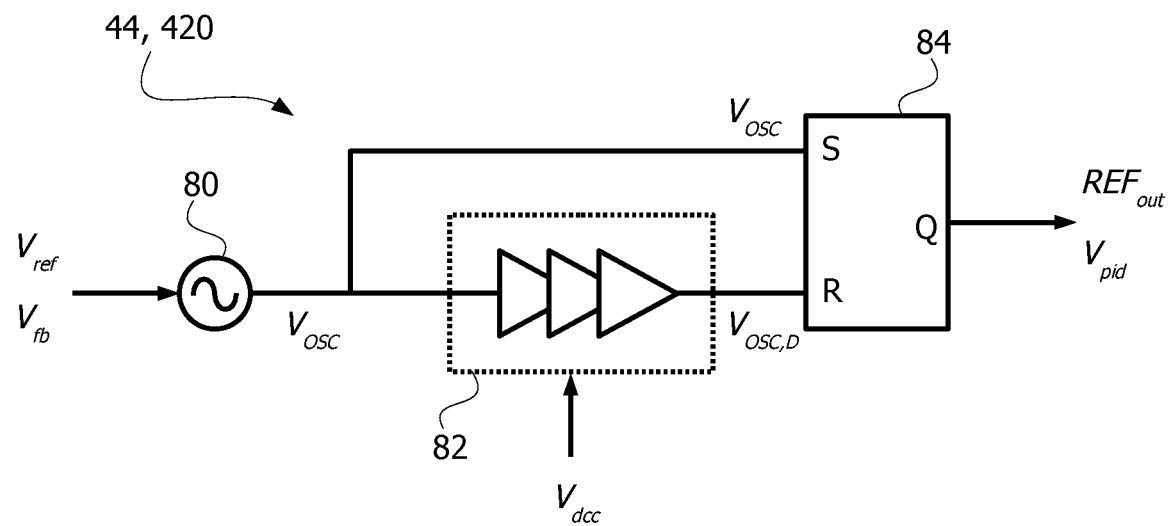
FIG. 8 is a circuit block diagram exemplary of possible implementation details of a voltage-controlled oscillator for use in one or more embodiments.

FIG. 8 is a circuit block diagram exemplary of a possible implementation of a voltage-controlled oscillator 44 or 420 as may be provided in one or more embodiments, configured to receive the duty-cycle control signal V$_{dcc}$ and adjust the duty-cycle of the output clock signal (REF$_{out}$ or V$_{pid}$) accordingly. As exemplified in FIG. 8, a voltage-controlled oscillator 80 receives a reference voltage (e.g., voltage V$_{ref}$ in the case of oscillator 44, or voltage V$_{fb}$ in the case of oscillator 420) and produces an oscillating signal V$_{OSC}$ having a frequency as a function of the reference voltage. A voltage-controlled or current-controlled delay line 82 receives the oscillating signal V$_{OSC}$ and the duty-cycle control signal V$_{dcc}$, and produces a delayed oscillating signal V$_{OSC,D}$ whose amount of delay is a function of the value of signal V$_{dcc}$. A logic circuit is configured to assert an output signal in response to an edge being detected in the oscillating signal V$_{OSC}$, and de-assert the output signal in response to a corresponding edge being detected in the delayed oscillating signal V$_{OSC,D}$. For instance, a set-reset (SR) flip-flop circuit 84 receives the oscillating signal V$_{OSC}$ at a respective SET (S) input terminal and the delayed oscillating signal V$_{OSC,D}$ at a respective RESET (R) input terminal. The output (Q) of flip-flop 84 is asserted (e.g., set to '1') in response to the rising edges of the oscillating signal V$_{OSC}$, and it is de-asserted (e.g., reset to '0') in response to the rising edges of the delayed oscillating signal V$_{OSC,D}$, so that the duty-cycle of the output signal (REF$_{out}$ or V$_{pid}$) is adjusted as a function of the value of signal V$_{dcc}$.

The controller topology disclosed herein may be used for any three-level-like based converter topology (like the ones described, for instance, in document [5]) or hybrid switched capacitor converter topology which relies on a 4-phase control algorithm.

Advantageously, a flying capacitor voltage balance control circuit as exemplified herein can also facilitate reducing the startup time of the converter without relying on pre-charge or dedicated startup circuitry.

One or more embodiments may be applied, for instance, in battery charger integrated circuits, power management integrated circuits (PMIC) (e.g., for use in wearable devices), USB-powered embedded applications, envelope tracking in radio frequency (RF) applications, and the like.

One or more embodiments may thus provide one or more of the following advantages:
  achieving high output voltage accuracy exploiting the benefit of time-based control;
  reducing the power consumption and the overall system complexity while maintaining good performance, insofar as high-resolution components such as PWM, ADCs, DACs are not required by one or more embodiments;
  small system impact/effort with respect to previous converter systems, insofar as some of the components used to regulate the voltage on the flying capacitor are already present in the control loop of the converter (e.g., the voltage-controlled oscillators 420 and 44) and only a duty-cycle control is introduced; and
  possibility of implementing the control circuitry according to one or more embodiments both for single-ended and for differential signals without significant changes in the area occupation of the controller.

Without prejudice to the underlying principles, the details and embodiments may vary, even significantly, with respect to what has been described by way of example only, without departing from the extent of protection.

The extent of protection is determined by the annexed claims.

LIST OF REFERENCE DOCUMENTS

[1] S. J. Kim, Q. Khan, M. Talegaonkar, A. Elshazly, A. Rao, N. Grissett, G. Winter, W. McIntyre, and P. K. Hanumolu, "High Frequency Buck Converter Design Using Time-Based Control Techniques," in IEEE Journal of Solid-State Circuits, vol. 50, no. 4, pp. 990-1001, April 2015, doi: 10.1109/JSSC.2014.2378216.

[2] S. J. Kim, R. K. Nandwana, Q. Khan, R. C. N. Pilawa-Podgurski, and P. K. Hanumolu, "A 4-Phase 30-70 MHz Switching Frequency Buck Converter Using a Time-Based Compensator," in IEEE Journal of Solid-State Circuits, vol. 50, no. 12, pp. 2814-2824, December 2015, doi: 10.1109/JSSC.2015.2456884.

[3] S. J. Kim, W. Choi, R. Pilawa-Podgurski, and P. K. Hanumolu, "A 10 MHz 2-800 mA 0.5-1.5 V 90% Peak Efficiency Time-Based Buck Converter With Seamless Transition Between PWM/PFM Modes," in IEEE Journal of Solid-State Circuits, vol. 53, no. 3, pp. 814-824, March 2018, doi: 10.1109/JSSC.2017.2776298.

[4] X. Liu, P. K. T. Mok, J. Jiang and W.-H. Ki, "Analysis and Design Considerations of Integrated 3-Level Buck Converters," in IEEE Transactions on Circuits and Systems I: Regular Papers, vol. 63, no. 5, pp. 671-682, May 2016, doi: 10.1109/TCSI.2016.2556098.

[5] Z. Xia and J. Stauth, "A Two-Stage Cascaded Hybrid Switched-Capacitor DC-DC Converter with 96.9% Peak Efficiency Tolerating 0.6 V/μs Input Slew Rate During Startup," 2021 IEEE International Solid-State Circuits Conference (ISSCC), 2021, pp. 256-258, doi: 10.1109/ISSCC42613.2021.9365763.

The invention claimed is:

1. A DC-DC converter circuit, comprising:
a switching stage arranged between an input node configured to receive an input voltage and a ground node configured to provide a ground voltage, the switching stage including:
a switching node selectively couplable to said input node and to said ground node, wherein the switching node is configured to be coupled to an inductor for producing an output voltage at an output node of the DC-DC converter circuit; and
a capacitor having a first terminal selectively couplable to said input node and to said switching node and a second terminal selectively couplable to said switching node and to said ground node;
a time-based feedback circuit including a first voltage-controlled oscillator, the time-based feedback circuit configured to produce a first clock signal having a frequency that is a function of said output voltage;
a second voltage-controlled oscillator configured to produce a second clock signal having a frequency that is a function of a reference voltage;
a logic circuit configured to produce, as a function of said first clock signal and said second clock signal, one or more control signals for controlling switching operation of said switching stage between:
a first operating phase wherein said capacitor is connected between said input node and said switching node;
a second operating phase wherein one of the first and second terminals of said capacitor is floating and said switching node is connected one of the input node and ground node;
a third operating phase wherein said capacitor is connected between said switching node and said ground node; and
a fourth operating phase wherein said one of the first and second terminals of said capacitor is floating and said switching node is connected said one of the input node and ground node; and
a voltage balancing circuit configured to sense a voltage across said capacitor, compare said sensed voltage to a target voltage, and produce a balancing signal indicative of a difference between said sensed voltage and said target voltage;
wherein at least one of said first voltage-controlled oscillator and said second voltage-controlled oscillator is configured to vary the duty-cycle of the first or second clock signal, respectively, as a function of said balancing signal, so that:
when said balancing signal is indicative of said sensed voltage being lower than said target voltage, a duration of said first operating phase is increased, and
when said balancing signal is indicative of said sensed voltage being higher than said target voltage, a duration of said third operating phase is increased.

2. The DC-DC converter circuit according to claim 1, wherein said switching stage comprises:
a first high-side switch arranged between said input node and a high-side intermediate node;
a second high-side switch arranged between said high-side intermediate node and said switching node;
a first low-side switch arranged between said switching node and a low-side intermediate node; and
a second low-side switch arranged between said low-side intermediate node and said ground node; and
wherein the first terminal of said capacitor is coupled to said high-side intermediate node and the second terminal of said capacitor is coupled to said low-side intermediate node.

3. The DC-DC converter circuit according to claim 1, further comprising a voltage divider circuit coupled to said output node of the DC-DC converter circuit and configured to produce a feedback voltage as a function of said output voltage and wherein said first voltage-controlled oscillator is configured to produce said first clock signal having a frequency that is a function of said feedback voltage.

4. The DC-DC converter circuit according to claim 1, wherein said first voltage-controlled oscillator is configured to produce an intermediate clock signal having a frequency that is a function of said output voltage, and wherein said time-based feedback circuit configured to produce said first clock signal further includes a first delay element configured to delay said intermediate clock signal as a function of a first signal indicative of said output voltage and a second delay element configured to delay said intermediate clock signal as a function of a second signal indicative of a time derivative of said output voltage.

5. The DC-DC converter circuit according to claim 1, wherein said logic circuit is configured to produce said one or more control signals so that said switching stage:
switches to said first operating phase in response to a rising edge detected in said second clock signal;
switches to said second operating phase in response to a rising edge detected in said first clock signal;
switches to said third operating phase in response to a falling edge detected in said second clock signal; and
switches to said fourth operating phase in response to a falling edge detected in said first clock signal.

6. The DC-DC converter circuit according to claim 1, wherein said logic circuit is configured to produce said one or more control signals so that said switching stage:
switches to said first operating phase in response to said first clock signal being de-asserted and said second clock signal being asserted;
switches to said second operating phase in response to said first clock signal being asserted and said second clock signal being asserted;
switches to said third operating phase in response to said first clock signal being asserted and said second clock signal being de-asserted; and
switches to said fourth operating phase in response to said first clock signal being de-asserted and said second clock signal being de-asserted.

7. The DC-DC converter circuit according to claim 1, wherein said target voltage is equal to half of said input voltage.

8. The DC-DC converter circuit according to claim 1, wherein said voltage balancing circuit includes a transconductance amplifier circuit having a first input configured to receive said voltage sensed across said capacitor and a second input configured to receive said target voltage, and a further capacitor having a first terminal coupled to an output of said transconductance amplifier to be charged and discharged thereby, wherein said balancing signal is produced at said first terminal of said further capacitor.

9. The DC-DC converter circuit according to claim 1, wherein said first voltage-controlled oscillator comprises:
an oscillator circuit configured to produce an oscillating signal having a frequency that is a function of the output voltage;

a delay circuit configured to produce a delayed replica of said oscillating signal, wherein an amount of delay of said delayed replica is a function of said balancing signal; and a logic circuit configured to assert said first clock signal in response to an edge detected in said oscillating signal, and de-assert said first clock signal in response to a corresponding edge detected in said delayed replica of said oscillating signal.

10. The DC-DC converter circuit according to claim 1, wherein said second voltage-controlled oscillator comprises:

an oscillator circuit configured to produce an oscillating signal having a frequency that is a function of the reference voltage;

a delay circuit configured to produce a delayed replica of said oscillating signal, wherein an amount of delay of said delayed replica is a function of said balancing signal; and a logic circuit configured to assert said second clock signal in response to an edge detected in said oscillating signal, and de-assert said second clock signal in response to a corresponding edge detected in said delayed replica of said oscillating signal.

11. A method of operating a DC-DC converter circuit, comprising:

providing an input voltage to an input node of the DC-DC converter circuit;

producing a first clock signal having a frequency that is a function of an output voltage of the DC-DC converter circuit;

producing a second clock signal having a frequency that is a function of a reference voltage;

switching operation of a switching stage of the DC-DC converter circuit, as a function of said first clock signal and said second clock signal, between:
 a first operating phase wherein a flying capacitor is connected between said input node and a switching node;
 a second operating phase wherein said flying capacitor has one floating terminal and said switching node is connected to one of said input node and a ground node;
 a third operating phase wherein said flying capacitor is connected between said switching node and said ground node; and
 a fourth operating phase wherein said flying capacitor has said one floating terminal and said switching node is connected to one of said input node and said ground node;

sensing a voltage across said flying capacitor;
comparing said sensed voltage to a target voltage;
producing a balancing signal indicative of a difference between said sensed voltage and said target voltage;
varying a duty-cycle of at least one of said first clock signal and said second clock signal as a function of said balancing signal, so that:
 when said balancing signal is indicative of said sensed voltage being lower than said target voltage, a duration of said first operating phase is increased, and
 when said balancing signal is indicative of said sensed voltage being higher than said target voltage, a duration of said third operating phase is increased.

12. A control circuit for controlling switching of a multi-level hybrid DC-DC converter, comprising:

a time-based feedback circuit including a first voltage-controlled oscillator, the time-based feedback circuit configured to produce a first clock signal having a frequency that is a function of an output voltage of the multi-level hybrid DC-DC converter;

a second voltage-controlled oscillator configured to produce a second clock signal having a frequency that is a function of a reference voltage;

a logic circuit configured to produce, as a function of said first clock signal and said second clock signal, signals for controlling switching connection of a flying capacitor of said multi-level hybrid DC-DC converter for:
 one operating phase where the flying capacitor is connected between the input node and a switching node; and
 another operating phase where the flying capacitor is connected between a ground node the switching node;

a voltage balancing circuit configured to sense a voltage across said flying capacitor, compare said sensed voltage to a target voltage, and produce a balancing signal indicative of a difference between said sensed voltage and said target voltage;

wherein at least one of said first voltage-controlled oscillator and said second voltage-controlled oscillator is configured to vary the duty-cycle of the first or second clock signal, respectively, as a function of said balancing signal, so that:
 when said balancing signal is indicative of said sensed voltage being lower than said target voltage, a duration of said one operating phase is increased, and
 when said balancing signal is indicative of said sensed voltage being higher than said target voltage, a duration of said another operating phase is increased.

13. The control circuit according to claim 12, wherein said first voltage-controlled oscillator is configured to produce an intermediate clock signal having a frequency that is a function of said output voltage, and wherein said time-based feedback circuit configured to produce said first clock signal further includes a first delay element configured to delay said intermediate clock signal as a function of a first signal indicative of said output voltage and a second delay element configured to delay said intermediate clock signal as a function of a second signal indicative of a time derivative of said output voltage.

14. The control circuit according to claim 12, wherein said voltage balancing circuit includes a transconductance amplifier circuit having a first input configured to receive said voltage sensed across said flying capacitor and a second input configured to receive said target voltage, and a further capacitor having a first terminal coupled to an output of said transconductance amplifier to be charged and discharged thereby, wherein said balancing signal is produced at said first terminal of said further capacitor.

15. The control circuit according to claim 12, wherein said first voltage-controlled oscillator comprises:

an oscillator circuit configured to produce an oscillating signal having a frequency that is a function of the output voltage;

a delay circuit configured to produce a delayed replica of said oscillating signal, wherein an amount of delay of said delayed replica is a function of said balancing signal; and a logic circuit configured to assert said first clock signal in response to an edge detected in said oscillating signal, and de-assert said first clock signal in response to a corresponding edge detected in said delayed replica of said oscillating signal.

16. The control circuit according to claim 12, wherein said second voltage-controlled oscillator comprises:
- an oscillator circuit configured to produce an oscillating signal having a frequency that is a function of the reference voltage;
- a delay circuit configured to produce a delayed replica of said oscillating signal, wherein an amount of delay of said delayed replica is a function of said balancing signal; and
- a logic circuit configured to assert said second clock signal in response to an edge detected in said oscillating signal, and de-assert said second clock signal in response to a corresponding edge detected in said delayed replica of said oscillating signal.

\* \* \* \* \*